United States Patent
Hollister et al.

(10) Patent No.: US 10,817,679 B2
(45) Date of Patent: Oct. 27, 2020

(54) MULTIDIMENSIONAL SIEVING FOR HIGH DENSITY LOW COLLISION RFID TAG FIELDS

(76) Inventors: Allen Hollister, La Habra, CA (US); Gary Barta, Duarte, CA (US); John T. Armstrong, Pasadena, CA (US)

(*) Notice: Subject to any disclaimer, the term of this patent is extended or adjusted under 35 U.S.C. 154(b) by 1086 days.

(21) Appl. No.: 11/698,243

(22) Filed: Jan. 26, 2007

(65) Prior Publication Data

US 2008/0180220 A1    Jul. 31, 2008

(51) Int. Cl.
*G06K 7/00*  (2006.01)
*G06K 7/10*  (2006.01)

(52) U.S. Cl.
CPC ....... *G06K 7/0008* (2013.01); *G06K 7/10029* (2013.01); *G06K 7/10069* (2013.01); *G06K 7/10217* (2013.01); *G06K 7/10356* (2013.01)

(58) Field of Classification Search
CPC ............. G06K 7/0008; G06K 7/10019; G06K 7/10029; G06K 7/10059; G06K 7/10069; G06K 7/10079; G06K 7/10089; G06K 7/10108; G06K 7/10217; G06K 7/10356
USPC ...................................... 340/10.2, 10.1, 825
See application file for complete search history.

(56) References Cited

U.S. PATENT DOCUMENTS

| | | | |
|---|---|---|---|
| 5,530,702 A | 6/1996 | Palmer et al. | 370/85.3 |
| 2002/0175805 A9 | 11/2002 | Armstrong et al. | 340/10.31 |
| 2004/0134984 A1* | 7/2004 | Powell et al. | 235/451 |
| 2007/0273481 A1* | 11/2007 | Soleimani | 340/10.1 |

OTHER PUBLICATIONS

Rohatgi, A. and Durgin, G.D, "Implementation of an Anti-Collision Differential-Offset Spread Spectrum RFID System", Jul. 9-14, 2006, Antennas and Propagation Society International Symposium, p. 3501-3504.*

* cited by examiner

*Primary Examiner* — Brian Zimmerman
*Assistant Examiner* — Sara Samson
(74) *Attorney, Agent, or Firm* — Pasadena Legal Group; Norman R. Van Treeck

(57) ABSTRACT

A system comprising an RFID Reader and an array of RFID Tags, where the tags have the ability to measure physical signal properties such as FM deviation and Received Signal Strength as examples and use these measurements to create a means to refrain from responding to the Reader, unless the measured values fall inside a range determined by a built in algorithm or decision tree or by the Reader and transmitted to the array of Tags in an outbound message. The system may also use non-physical parameters, including tokens sent by the Interrogator/Reader to the Tag field. Moreover, physical parameters may be divided into maskable and unmaskable parameters. Signal frequency is not maskable by the environment, for example, but signal amplitude and phase are maskable by the environment during propagation. Additionally, the number, the nature and the range of each Multidimensional Variable are set by the Interrogator at the start of a session. In this way, foreknowledge or good estimates of the tag population will lead to higher efficiency operation.

16 Claims, 15 Drawing Sheets

MULTIDIMENSIONAL SIEVING FOR HIGH DENSITY LOW COLLISION RFID TAG FIELDS

FIELD OF THE INVENTION

A system and method for communicating between a host computer and a plurality of RFID transponders (sometimes called tags) through one or more interrogator units is disclosed. More specifically, a system and method is provided which greatly reduces the interference caused by transmissions from RFID transponders to those interrogator units, which increases the spatial area available between an interrogator and an RFID transponder and which allows communication between an interrogator and a large body of RFID transponders, among various other advantages.

BACKGROUND

As described in U.S. Pat. No. 5,530,702, to Palmer et al., a significant difficulty in establishing a multipoint communications system using transponders is how to prevent the transponders from attempting to communicate with the host at the same time. Such common transmissions usually cause a "collision" among the various transmissions and thereby corrupt the transmitted messages rendering them unintelligible to the host system. In the '702 patent, upon receipt of a "begin" signal transmitted by the host computer (through an interrogator), each transponder generates a random number and initiates an internal counter. When the count of the internal counter matches the random number, the transponder transmits a "request to transmit" signal to the host computer. Upon receipt of such "request to transmit" signal, the host computer transmits a first acknowledgment signal to all of the transponders. If the transponder which has transmitted the "request to transmit" signal receives this first acknowledgment signal within a predetermined period of time, it concludes that it has been given permission to transmit, and transmits an information-based signal to the host computer. If the transponder does not receive the first acknowledgment signal within the predetermined period of time, it generates a new random number and initiates the counter again. In this manner, a large body of transponders may communicate with a host computer. A problem with this approach, as with any approach utilizing random response delays, is that there must be a good estimate of the total transponder population. If there are fewer transponders than expected in the field, this approach will spend an unduly long time waiting for responses, while if the population is too great, this method will be contending with large numbers of collisions for long periods of time.

Another problem facing conventional RFID systems is that, in order to read RFID transponders that may be distributed over an area that is considerably larger than the spatial range of a single interrogator antenna assembly, either an interrogator must roam the area or fixed-position interrogators must be positioned in an array located within the area. The latter configuration is preferred in most automated applications. However, if adjacent interrogators in such an array are used simultaneously to read data from transponders in the area, their signals may interfere with each other. Therefore, it is usually necessary to operate the multiple interrogators one at time in a sequential manner. In some applications, a typical floor space may require 500 or more interrogators. If only one interrogator were to be operated at a time, and if each interrogator required several minutes to complete the reading from, or writing to, the RFID transponders within its range, then the entire operation could take several hours to complete. In many situations, it is important to complete this operation as fast as possible so that other tasks may be permitted to resume.

As described in U.S. Patent Application U.S.20020175805 to Armstrong, et al (hereinafter referred to as the "805 patent), one way to reduce the number of collisions in a truly large Transponder (RFID Tag) population is to have each Tag use an internally generated random number to compare against a value sent by the Interrogator called an Opportunity Cost (Opp_Cost). If the tag's random number exceeded the Opp_Cost, the Tag assumed the authority to transmit, while if the tag's random number was less than the Opp_Cost, it would wait. This mechanism provides a method of throttling the responses down from thousands to a few. Things missing in the '805 patent include allowance of a parametric exchange rather than the random number itself; an ability to manipulate the range and scope of the Opp_Cost; the ability to cause a Tags with the same unique identity value to be split up, and the ability to obtain an estimate of the entire Tag population. Consequently, in the '805 patent, the Opp_Cost is started near the fully throttled (max) position, then, depending on the number of responses detected, is either maintained or decremented. If the decrement made is too large, collisions result. If the range of the Opp_cost variable is set in the original hardware to a value of $2^{15}$ (EPC™ Radio-Frequency Identity Protocols Class-1 Generation-2 UHF RFID, Protocols for Communication at 860 MHz-960 MHz, Version 1.0.9, Table 6.4—Collision Management Properties) and the Tag population is only 500, then the system spends unnecessary time descending from $2^{15}$ down to $2^9$. Therefore a need exists for optimizing this approach for low density tag populations which requires having a mechanism for adjusting the range of the Opp_cost variable.

SUMMARY

A system comprising an RFID Reader and an array of RFID Tags, where the tags have the ability to measure physical signal properties such as FM deviation and Received Signal Strength as examples and use these measurements to create a means to refrain from responding to the Reader, unless the measured values fall inside a range determined by a built in algorithm or decision tree or by the Reader and transmitted to the array of Tags in an outbound message. The system may also use non-physical parameters, including tokens sent by the Interrogator/Reader to the Tag field. Moreover, physical parameters may be divided into maskable and unmaskable parameters. Signal frequency is not maskable by the environment, for example, but signal amplitude and phase are maskable by the environment during propagation. Additionally, the number, the nature and the range of each Multidimensional Variable are set by the Interrogator at the start of a session. In this way, foreknowledge or good estimates of the tag population will lead to higher efficiency operation.

Other features and advantages will be apparent to one skilled in the art given the benefit of the following disclosure.

DETAILED DESCRIPTION OF THE DRAWINGS

Figure 1:
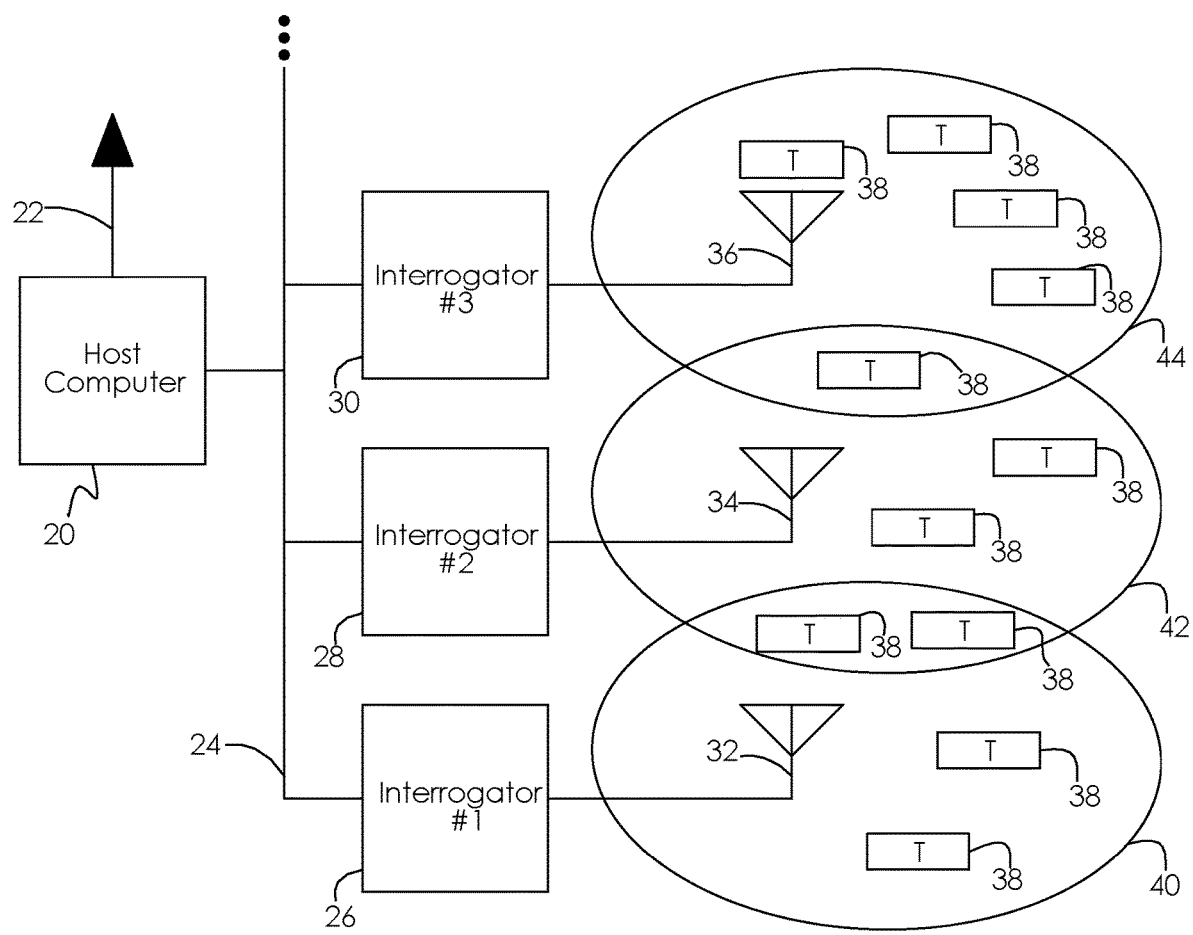
FIG. 1 is a block diagram illustrating one type of system for communicating between a host computer and a plurality of RFID tags.

FIG. 1 illustrates an RFID system consisting of a host computer 20 connected to a network 22, which interfaces with customer owned data maintenance equipment. The host computer 20 communicates with one or more interrogators, 26, 28, 30 and others, via a wired or wireless data network 24. Each of the interrogators may communicate with a subset of all the tags in a store, for example interrogator 26 using antenna 32 may communicate with the tags in area 40, while the interrogator 28 may communicate with the tags in area 42. Within area 40, there are some tags that also lie within area 42, and similarly, there are tags in area 44 that lie within area 42. In the RFID system shown all of the tags will take on unique addresses, so that no matter which interrogator reads the tag, the tag will not be "double counted" While FIG. 1 illustrates separate interrogators feeding separate antennas is should be recognized that antenna switching to a single interrogator would accomplish the same coverage. Turning once again to FIG. 1, the tag identities collected by each of the interrogators is fed to a central database in the host computer 20 which then sorts the lists and merges the list into a single list (not shown). In FIG. 1, the tag field viewed by antenna 32 has 4 tags, while antenna 34 sees 5 tags and antenna 36 sees 5 tags. In this example, antenna 34 has collected data from 3 tags that are also collectable from either antenna 36 or antenna 32. When the host computer integrates the data, the unique tag addresses will show up more than once for the tags that were collected by two interrogators. By grouping on the unique tag address, and counting the groups, the actual number of tags is obtained. Useful information may also be obtained by tracking a tag's movement between two regions of coverage. For example, suppose a tag "disappears" from the count of antenna 32 and re-appears in the area seen by antenna 34, which happens to be dressing rooms, then disappears from antenna 34 without re-appearing. This event may be used to generate an alarm condition, wherein every interrogator in the store attempts to read the missing tag. If it is still not seen, a store representative may be sent to the dressing room area to observe the patrons and examine their goods. Also depending on the local laws, the interrogators may be used sequentially or many at once. Clearly, if a large number of interrogators may be used in parallel, the time to inventory an area may be minimized.

Figure 2:
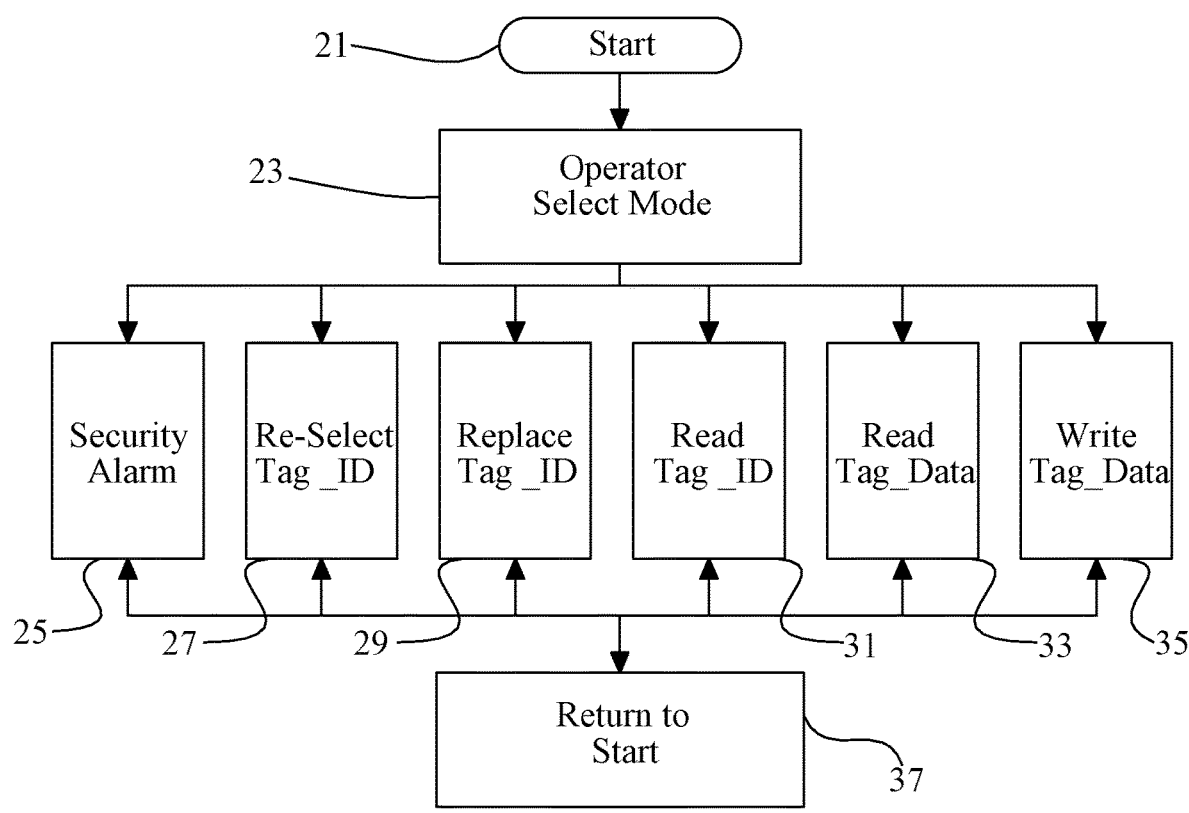
FIG. 2 is a flow chart detailing a plurality of modes of operation for implementation in the system shown in FIG. 1.

FIG. 2 Illustrates the particular states a tag may be in while responding to an Interrogator. Each of the states 21 through 37 shown are independent of the other states, and represents an action being requested of the tag by the interrogator. Actions to Replace Tag_ID 29, Read Tag_ID 31, Read Tag_Data 33, and Write Tag_Data 35, are common tasks to all systems with memory that may be randomly read and written. The tasks Alarm 25 and Re-Select Tag_ID 27 fall into another class. Security alarm 25 is similar to a memory dump. Consider each tag to be an array of data, and the space of all tags is the collection of arrays, The alarm task requests any array that is not empty to report creating a 'calling all tags' event, wherein any and all tags that receive this command will immediately reply. The Reselect Tag_ID 27 task is a critical differentiator between this invention and the previous work of Armstrong, et al in Pub. No. U.S. 2002/01'75805 A9. In the '805 patent, this task consisted of telling the tag field, each and every tag in range of the interrogator, to reselect a unique identifier. In the '805 patent, each tag used an internally generated random number, whitened by a statistically white noise source, as its new identity. As long as the modulus of the number was high enough, the probability of two tags choosing the same unique ID may be made vanishingly small. For example, it there are 10,000 tags, and the modulus of the random number is 1,000,000,000 ($2^{30}$), then the probability of two tags taking on the same unique number is 0.00001. In fact the tag field would have to be 100,000 tags before there is a probability that two tags will share a unique name. In the '805 patent, the modulus of the random number was chosen in the design phase, and may be many times larger than necessary, leading to longer read times than necessary. In the current invention, multidimensional sieving, the degree of separation between tag unique identifiers is a consequence of parameters set up during the individual sessions. If a small number of tags are in use, the number of dimensions used may be reduced as well. In fact, the ability of the tag to work within larger and larger groups may be a commodity—a capability sold to the customer as needed, allowing one price for clients needing only moderate counts, as in check out counters, and another price for clients needing to inventory whole stores.

Figure 3:
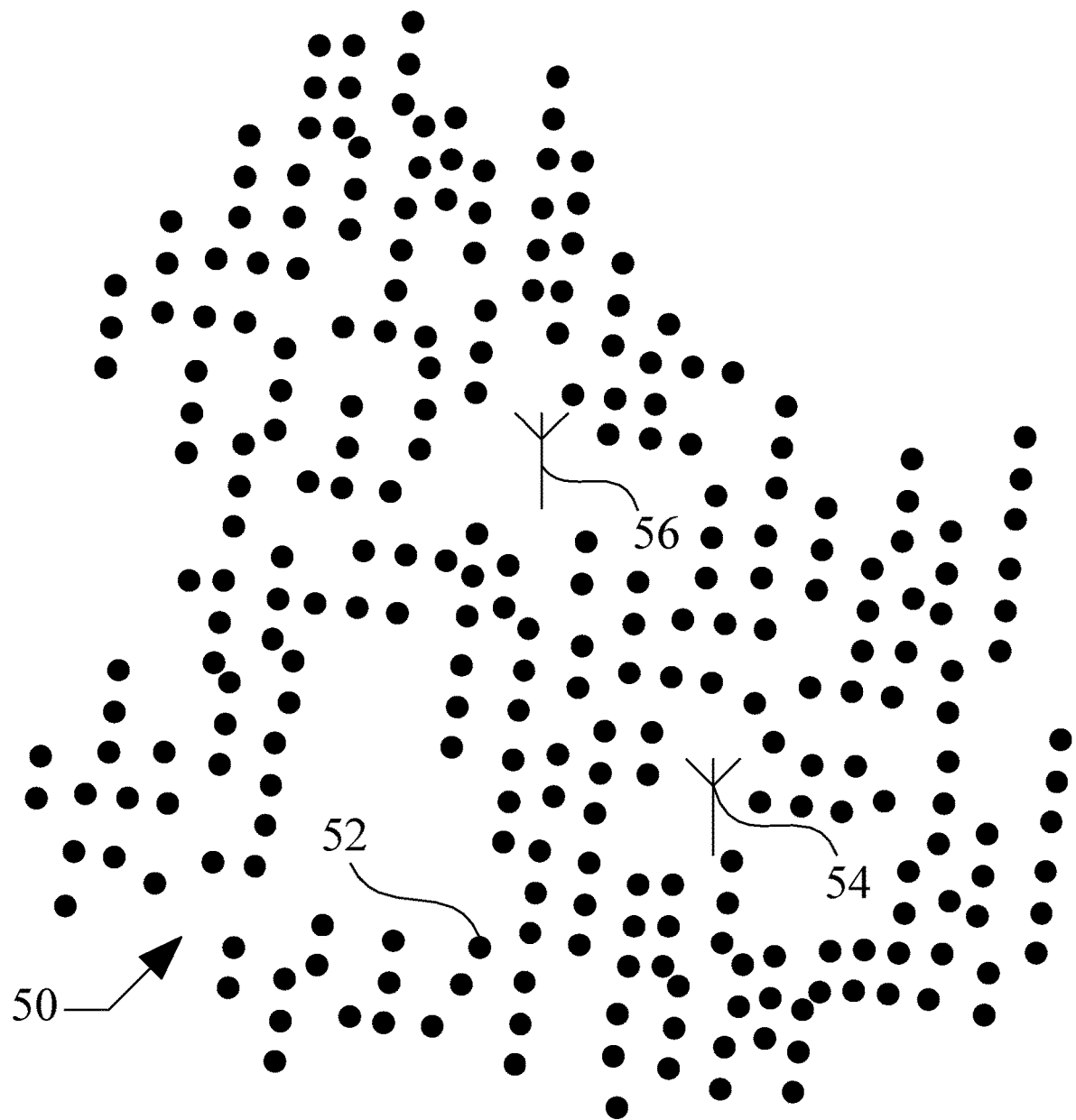
FIG. 3 graphically show the challenge of communicating to a large RFID tag field using a single transmit and receive system.

FIG. 3 graphically illustrates a simplified system 50 for identifying RFID tags 52 in a high tag density environment having unequally spaced RFID tags 52 using isotropic transmit and receive antennas 56 and 54. The system 50 illuminates RFID tags 52 with RF energy from the transmit antenna 56 transmitting an interrogation RF field to all tags to request their ID number, which is received with the antenna 54 and processed by the system 50. More specifically, upon receiving an interrogation command from the transmit antenna 56, each tag will respond with an RF burst containing its ID intended for the receive antenna 54. In this case all tags receive the interrogation command and all begin to transmit at the same time, resulting in massive interference since all the tags 52 are radiating simultaneously. This is much like shouting into a crowded room "everyone yell your name" wherein the result is a lot of noise and nothing is intelligible.

In an Aloha network, (the most common variety of network used in RFID systems), the protocol is to have everyone respond immediately upon receiving an interrogation signal. If the tag response doesn't get through, all tags back off for a random period of time and then try again. If two or more tags try to talk at the same time, the result is referred to as a collision. In small tag densities this technique may work fine, but in large tag fields, so many collisions occur that all time is consumed by transmit attempts, followed by a collision, followed by a random time back off followed by a new attempt. Just like a crowded freeway, throughput drops dramatically, sometimes to zero. Therefore a method is described herein for keeping all the tags from responding at the same time. Instead they will respond in a time sequence that allows for few collisions with all the tags being read in the shortest possible time.

FIGS. 4A through 4I illustrate the process of throttling the responses from a large RFID tag field using the multidimensional vector algorithm. For simplicity, these algorithms exclude consideration of how the tags are powered up and initialized.

Beginning with process 82 (Start), the system is quiescent; with neither interrogation/read commands, nor tags responses are occurring. Upon receipt of a read command by process 84, the tag moves to process 86, where it initializes selected Multidimensional Vector (MDV) parameters. Upon completion process 90 sets a reply bit to a logical True value, whereupon the state of the tag moves to process A 92.

Figure 4A:
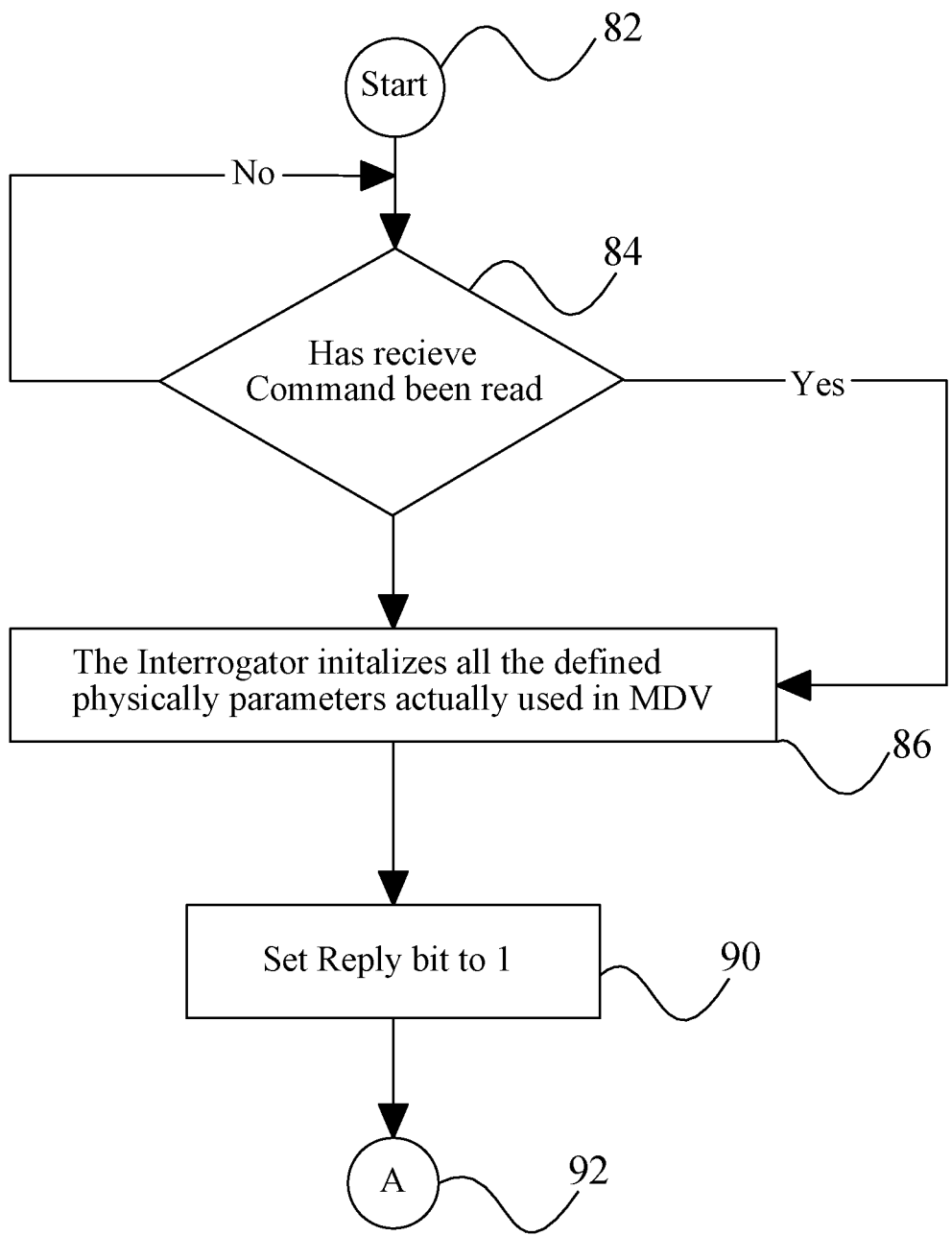
FIGS. 4A through 4I are flowcharts describing the process of throttling the responses from a large RFID tag field using a multidimensional vector algorithm.
Figure 4B:
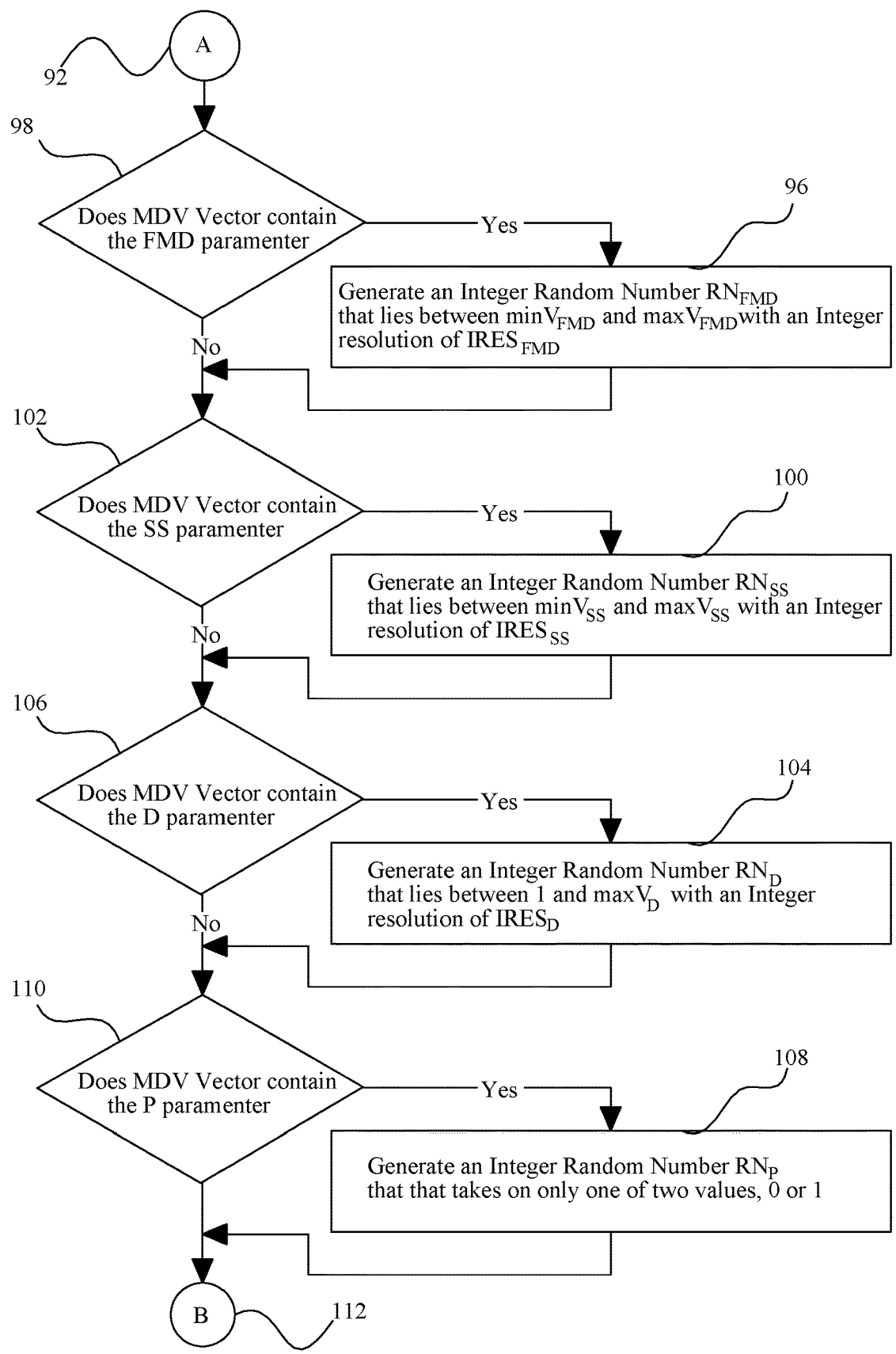
Figure 4C:
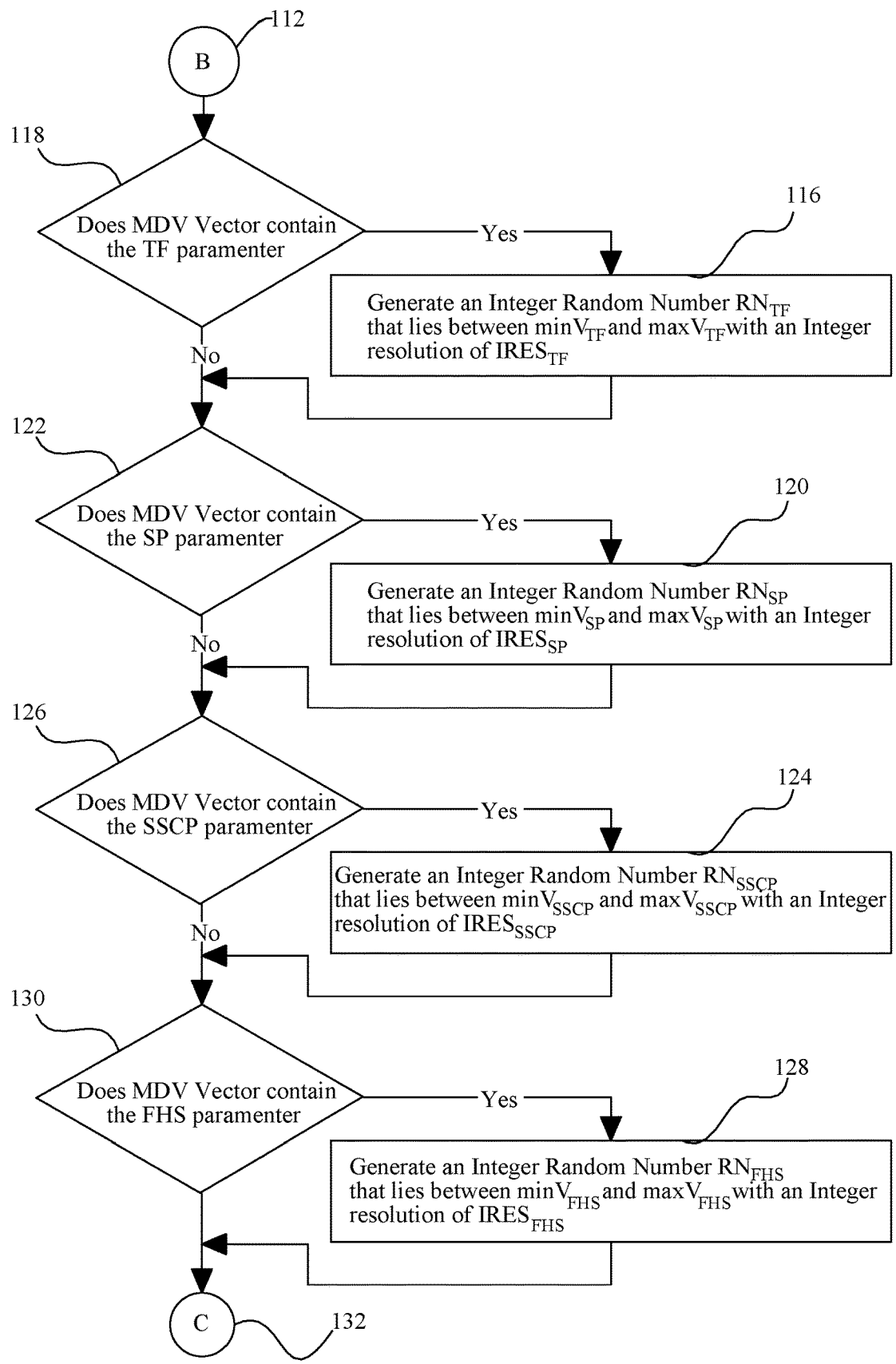

In FIGS. 4B and 4C the tag moves from state A 92 through state B 112 to state C 132 by performing comparisons between the internally set MDV parameters and the observed signal properties or data content. In the FIGS. 4B and 4C, the parameters illustrating this process are FM Deviation, Signal Strength, Direction, Polarization, Transmit Frequency, Signal Phase, Spread Spectrum Code Parameters, and Frequency Hop Sequence.

Beginning at state A 92, and proceeding in no particular order, the tag will use its internal user selectable mask to choose which parameters of the Multidimensional Vector Space will used as the basis for constructing its Multidimensional Vector (MDV). This determination is done in conditional process 98 for the FM Deviation parameter (FMD); in the conditional process 102 for the Signal Strength parameter (SS); in the conditional process 106 for the Direction parameter (D); in the conditional process 110 for the Polarization parameter (P); in conditional process 118 for the Transmit Frequency parameter (TF); in the conditional process 122 for the Signal Phase parameter (SP); in the conditional process 126 for the Spread Spectrum Code Parameter (SSCP); in the conditional process 130 for the Frequency Hop Sequence parameter (FHS). In each of these processes, if the parameter is not present, then the flow simply falls through to the next test. If the parameter is present, then the flow goes to a tag process that generates an integer random number, which may take on any of the allowed values for that parameter. For example, process 96 generates an integer random number $RN_{FMD}$ which lies between the values $minV_{FMD}$ and $maxV_{FMD}$, where $minV_{FMD}$ and $maxV_{FMD}$ are, respectively the minimum system measurable value for FM Deviation and the maximum system measurable value of FM Deviation. The resolution of this parameter is $Ires_{FMD}$.

Similarly, in processes 100, 104, and 108, MDV basis values $RN_{SS}$ with resolution $Ires_{SS}$, $RN_D$ with resolution $Ires_D$, and $RN_P$ with values 0 or 1 are generated, respectively, for Signal Strength, Direction, and Polarization.

In the same way, as shown in FIG. 4C, processes 118, 122, 126, and 130 are used to generate the basis values for the parameters Transmit Frequency (TF), Signal Phase (SP), Spread Spectrum Code (SSCP), and Frequency Hop Sequence (FHS) respectively. In process blocks 116, 120, 124 and 128 the respective basis values generated are $RN_{TF}$ with resolution $Ires_{TF}$, $RN_{SP}$ with resolution $Ires_{SP}$, $RN_{SSCP}$ with resolution $Ires_{SSCP}$, and $RN_{FHS}$ with resolution $Ires_{FHS}$ are generated. The resulting subset of the total Multidimensional Vector Space, the tag's internal MDV will be dimensionally large, and during each interrogator/reader cycle, the tag will compare interrogator/reader generated, environmentally modified, values MEAS to the basis vectors in the MDV. When a match occurs, the tag will respond.

As mentioned above, the basis elements for the MDV consist of both environmentally maskable and unmaskable parameters. Examples of unmaskable parameters are Frequency, Frequency Deviation, Spread Spectrum Code Parameters, Frequency Hop parameters, and Time or Day and Timeslot choice. Examples that are maskable include Direction, Phase, Polarization, and Signal Strength.

Treatment of maskable and non maskable parameters is necessarily different because the range of values accessible to the tag is dependent on the physical environment and relationship between the tag and the reader. For example, an object unrelated to either the tag or the interrogator/reader is capable of causing the received signal to vary in phase and amplitude by changing the preferred propagation path between the reader and the tag.

Figure 4D:
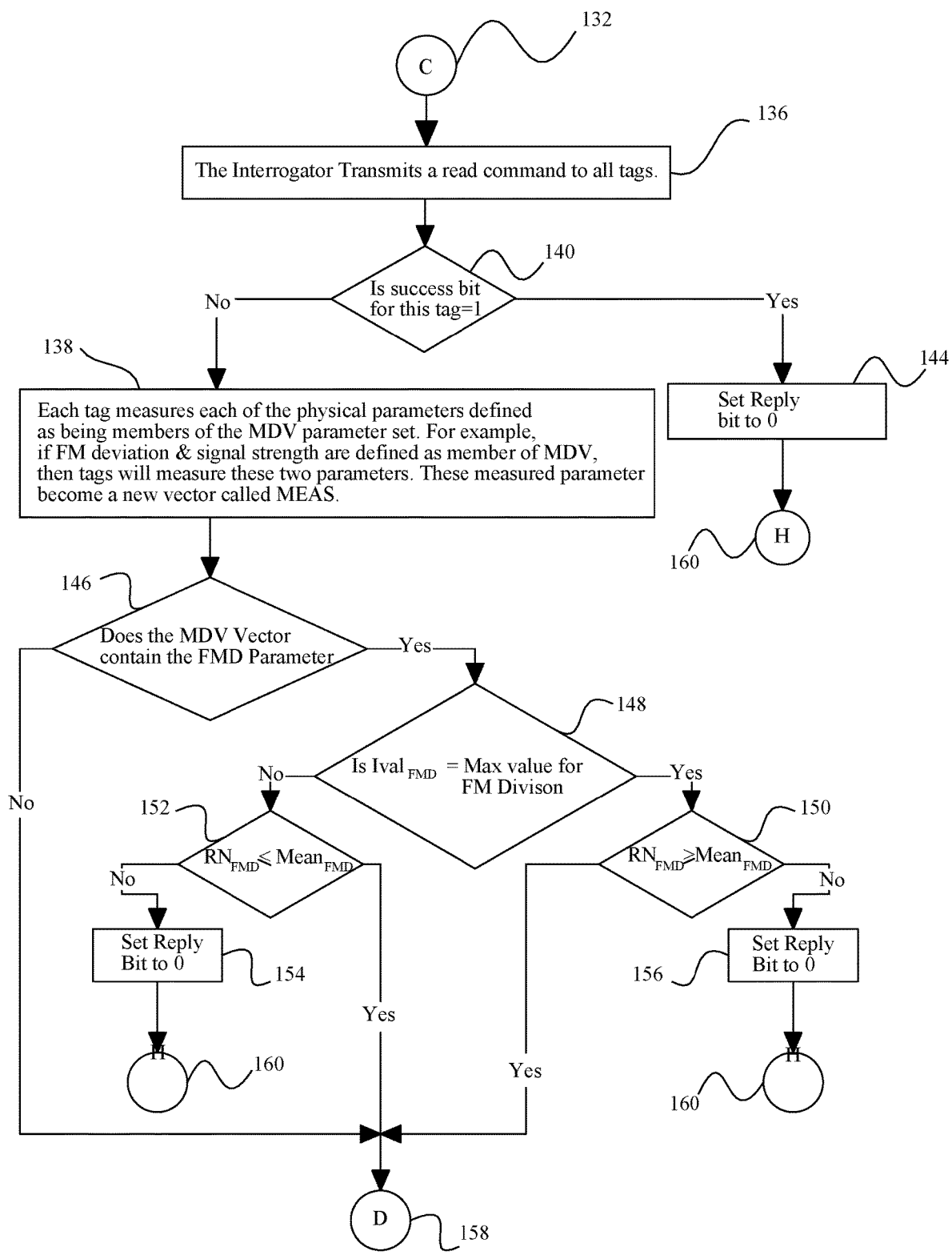

FIG. 4D illustrates the comparison process between the tag's internally generated MDV parameter and the measured MDV parameter (MEAS) from the interrogator/reader when the basis function is the non-maskable parameter FM Deviation (FMD). Commencing at C 132, the interrogator/reader transmits a read command in process 136. The tag process continues with process 140, which tests the value of the Success Bit. If the Success Bit is True, the tag has previously been read, and the process branches to process 144 which sets the Reply bit to False, causing the process to skip all of the MDV comparisons and move to state H 160. If the Success Bit is False, the process continues with process 138.

In process 138, each tag in range of the interrogator/reader compares the parameter value stored in MDV with the value of that parameter as measured during the interrogator/read cycle, MEAS. In the case of FMD, the measured value will be in the range from $minV_{FMD}$ to $maxV_{FMD}$ and it is compared against the value of $RN_{FMD}$. Process 146 tests whether the parameter is included in the MEAS vector, and if not, the local process is skipped, and processing continues at D 158.

The next process 148 tests whether the response should be made when the measured value is above, or below, the MDV value. This is accomplished by testing whether the initial value $Ival_{FMD}$ is equal to the maximum value for FM deviation ($maxV_{FMD}$). If it is, the process is moving from large Frequency Modulation values toward smaller ones, and the response from the tag is inhibited until MEAS is below the value $RN_{FMD}$ as shown in processes 150 and 156. Alternatively, if $Ival_{FMD}$ is equal to $minV_{FMD}$, the process is incrementing Frequency Modulation and the response from the tag is inhibited until the MEAS parameter is above $RN_{FMD}$ as shown in processes 152 and 154. Basically, the output of this and all comparison processes is setting the reply bit to False, skipping all subsequent processing down to state H 160, if the threshold has not yet been exceeded.

Figure 4E:
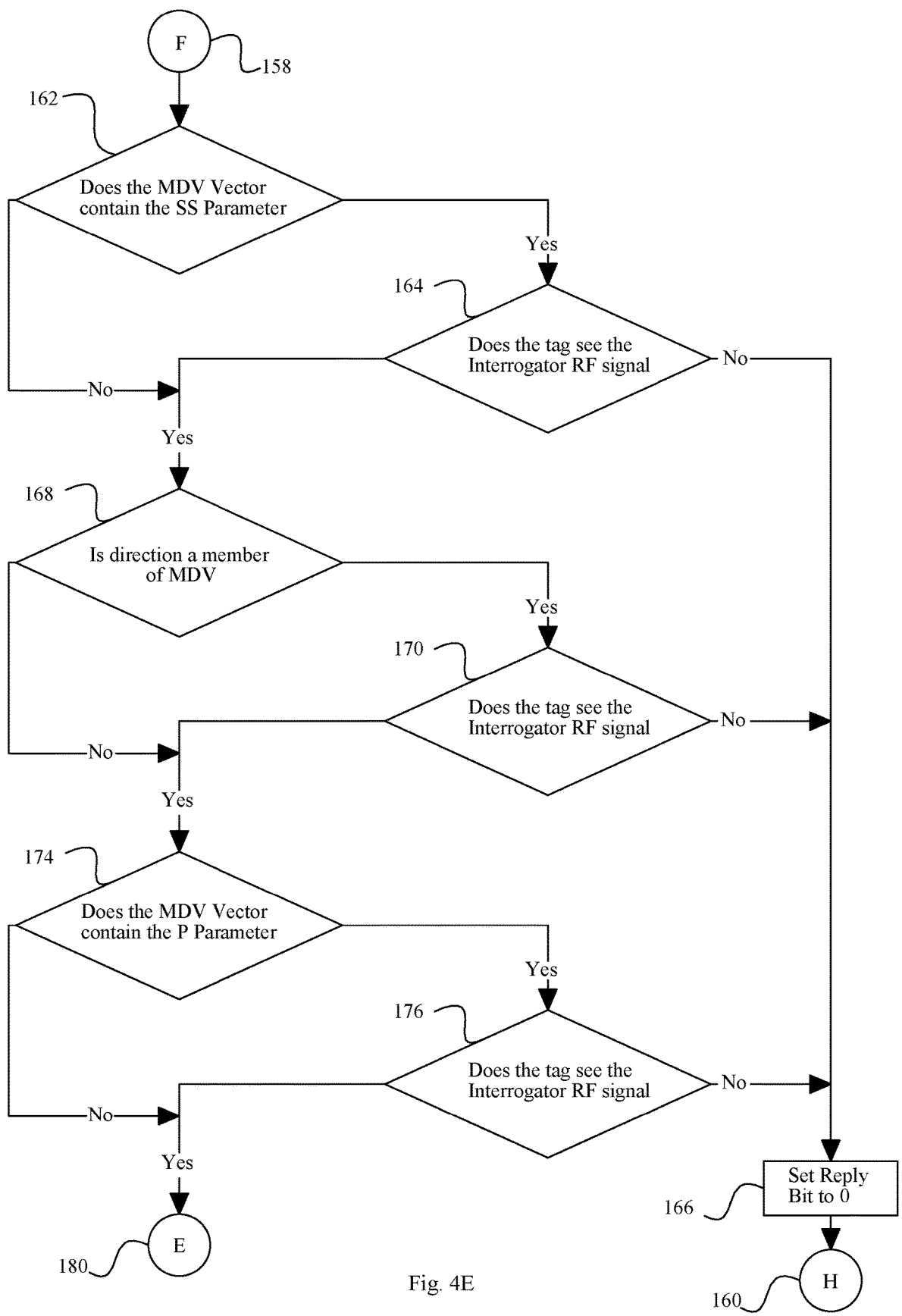
Figure 4F:
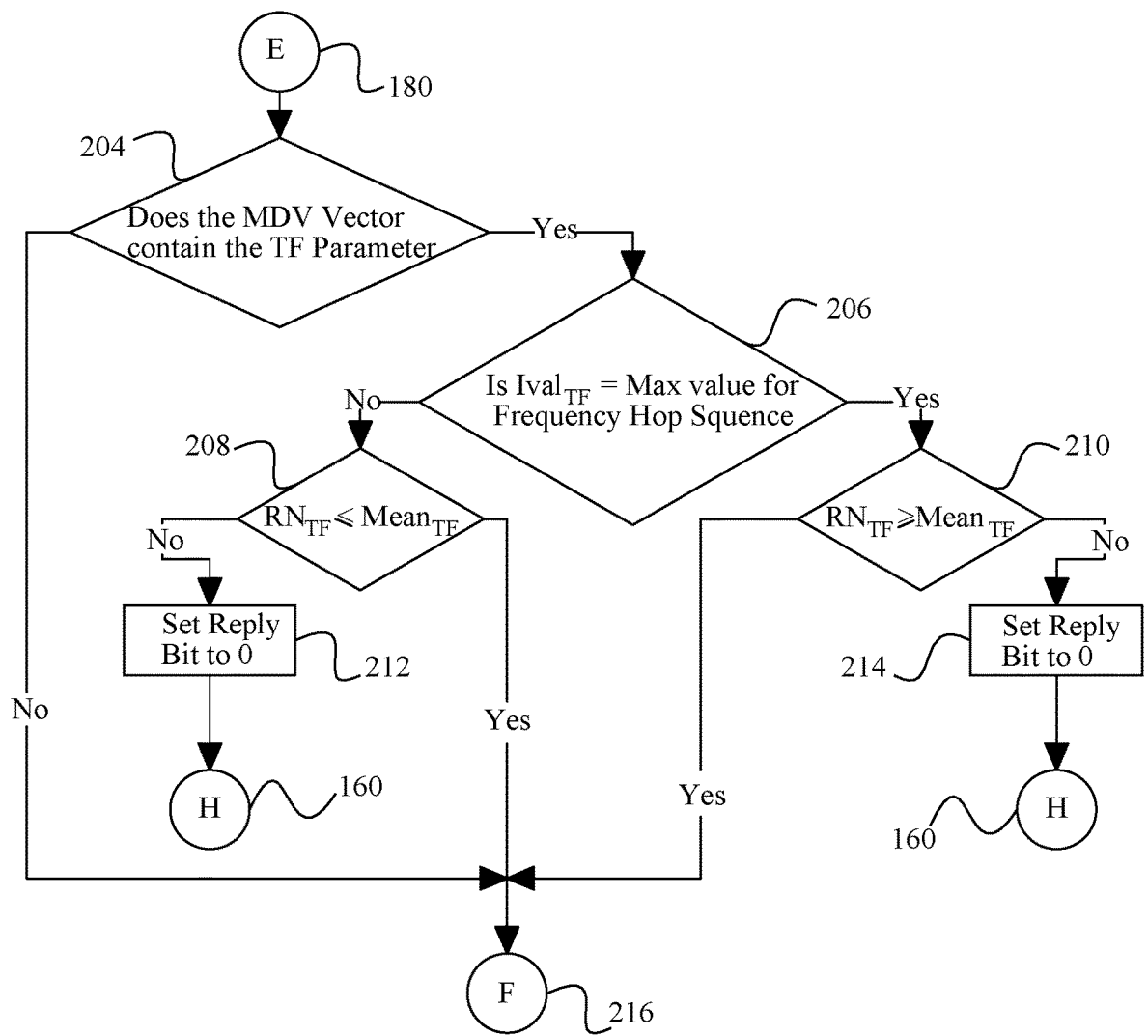

Other non maskable parameters handled in the identical way include Transmit Frequency (TF) processing from state E 180 to state F 216 on FIG. 4F, in processes 204, 206, 208, 210, 212, and 214; Spread Spectrum Code Parameters (SSCP) in processes 232, 234, 236, 238, 240, and 242 on FIG. 4G; and Frequency Hop Sequence (FHS) processing on FIG. 4H from state G 244 through processes 248, 250, 252, 254, 256, and 258.

FIG. 4E illustrates processing of environmentally maskable parameters Signal Strength (SS), Direction (D), and Polarization (P). Just as each of the non-maskable parameters are handled with the same comparison engine, each of the aforementioned maskable parameters, as well as all other environmentally maskable parameters is handled in the same way by the mechanism described below. Proceeding from state D, 158, process 162 determines if Signal Strength is a measurable MDV parameter. If not, the local process is skipped and processing continues with the next parameter test 168. If Signal Strength is included in the MDV, process 164 tests whether the parameter (SS) is observable in MEAS. If this test 164 is False, the reply bit 166 is set to False and the process falls through to state H 160. If the test 164 is True, the process continues with the next parameter test 168.

Figure 4G:
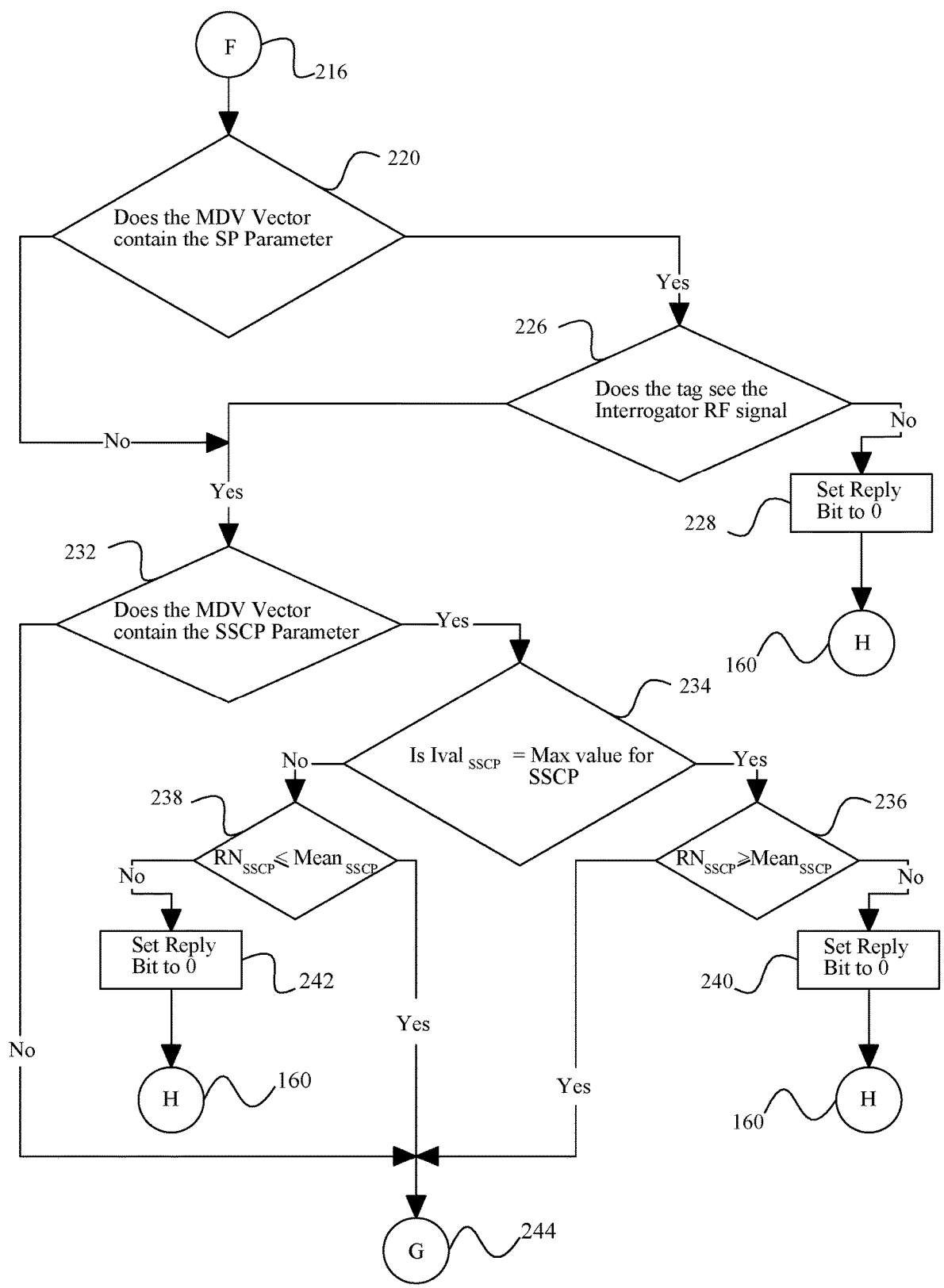

The processing of maskable parameters proceeds in an identical fashion for testing the parameters Direction (D) 168-170, Polarization (P) 174-176, and Signal Phase (SP) 220-228 on FIG. 4G.

Figure 4H:
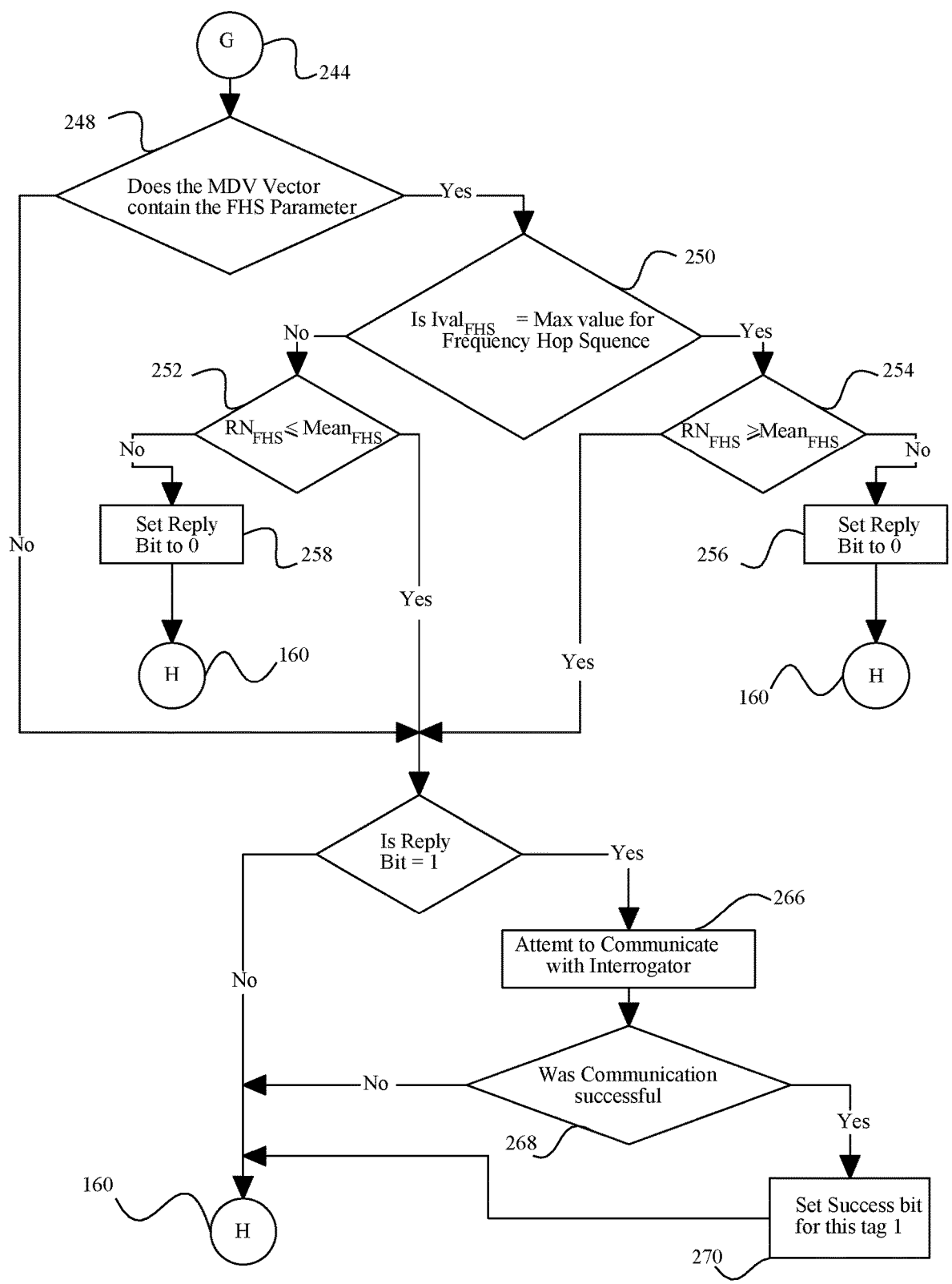

FIG. 4H, in addition to the processing for the non maskable parameter FHS, contains the response process. If the reply bit is still True after all the filtering achieved by comparing the MDV with MEAS, the tag will attempt to communicate in process 266 with the interrogator/reader. Upon successful communication 268, the Success Bit is set to True in process 270, and processing resumes at H 160. If the communication in process 266 is unsuccessful, process 268 causes a branch to H 160 without setting the Success Bit.

Figure 4I:
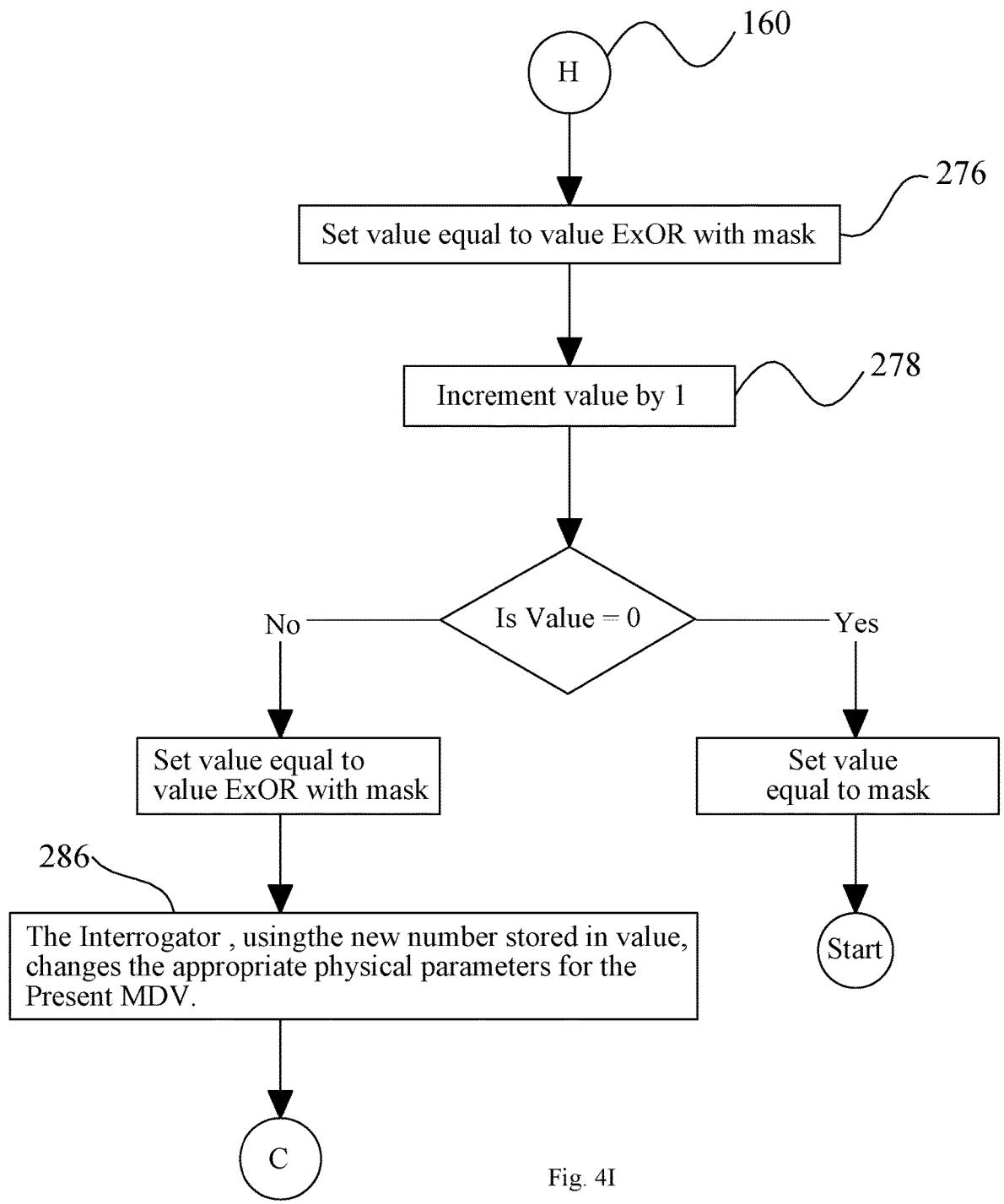

FIG. 4I begins with state H 160. At this point the tag has either not attempted to communicate because the filtering with MDV against MEAS has prevented it, or the tag has attempted to communicate with the interrogator reader. If an attempt has been made, and it was successful, the Success Bit has been set in process 270, otherwise it has not.

Process 276 initializes the interrogator/reader for the next read cycle. A binary constant, called Mask, contains information as to whether an individual parameter in the range of MDV parameters is to be used, and if so, whether it will be incremented or decremented at each interrogator read cycle until the threshold is reached and the tag responds.

Value is another binary parameter which is initially equal to MASK, but the contents of Value are altered in processes 276 and 278 on each subsequent interrogator read cycle by exclusive OR-ing it with the contents of MASK and then adding 1 to Value in process 278. The result is that regardless of the value of Mask, a count is created that walks the system through all necessary values, modulo the order of MASK. When it completes, the count rolls over and the process begins again with Value equal to Mask, branching back to Start 82. While Value is not equal to Mask, the process continues with the content of Value created from the exclusive OR of Mask and the prior contents of Value. The interrogator, using the new Value changes the appropriate physical parameters in process 286 and continues at state C.

Figure 5:
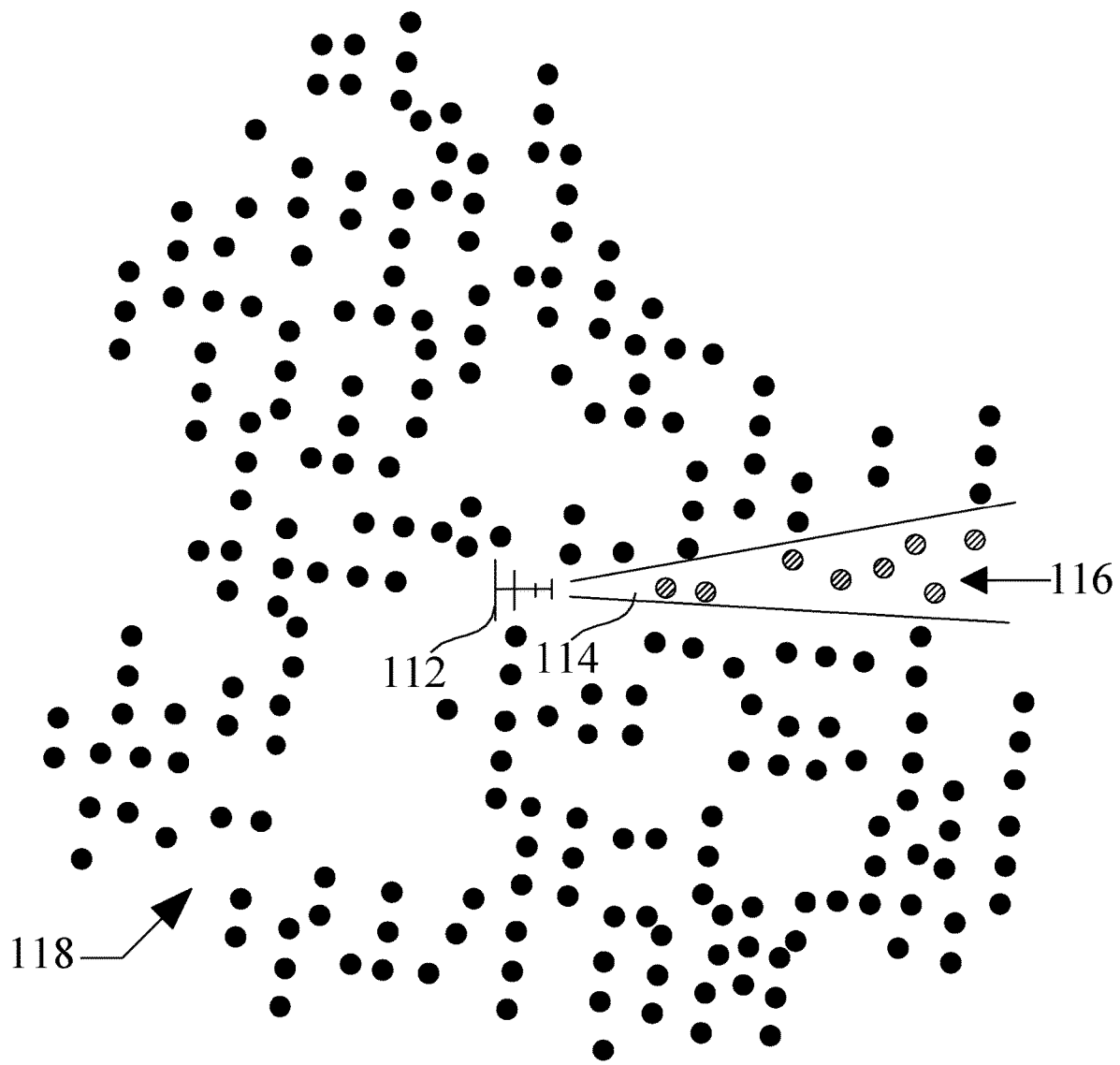
FIG. 5 graphically illustrates a simplified system for programming a location into RFID tags in a high tag density environment.

An interesting variant of this approach is to use only one directional transmit antenna. This technique is shown in FIG. 5. In this case, a directional antenna, 112 is used to initially write a direction dimension (114) (part of the MDV) to all tags. For example, an antenna that has the ability to transmit in 36 degree direction increments would result in 10 spatially distinct choices. Only tags within the antenna pattern would "see" the energy from the antenna (directional antennas by definition put all of the RF energy into the direction of their current antenna pattern). If the transmit antenna 112 was pointed in an arbitrary direction called position 1 (labeled 114), and as part of the transmission, it labeled the direction position 1, then all tags receiving the message would know they were part of the set position 1 and would store that number. These tags are represented by 116. Tags not part of position 1 are labeled 118. The antenna would then change its direction to position 2. It would then transmit position 2, and a new set of tags would be radiated and receive the message that they were part of the set of tags located at position 2. This would continue until all positions had been created (a total of ten in this example). A further refinement is available if the Tag sees both a transmit labeled 1 and a transmit labeled 2. During subsequent reads, the 'directions' 1, (1 and 2), and 2 are all distinct, increasing the number of distinct sets from 10 to 20, without increasing the gain of the antenna. During a normal read, the recorded number is used as an input to the MDV (it wouldn't need a random number in this case). During the initial tag programming process, it may be desirable to control the signal power. When an antenna goes from omni directional to directional, the power in the transmitted direction increases by the amount of directionally. For example, an antenna that has 36 degrees of direction resolution puts 10 times more power into its beam for a given distance over that of an omni directional antenna. So the power in the directional case must be normalized to that of the omni case in order to make the directionally programmed tags the same as the number that will be read later during a normal tag read cycle.

A normal omni directional antenna could be used for reading tag identities (ID's) by simply including a rotational identifier (from A to T), which includes the 10 cardinal directions and the overlap directions, as one of the non-physical parameters transmitted by the interrogator/receiver. (For bit efficiency, the position may be a power of 2, 8 or 16 for example). The identifier (A to T) was related to a physical antenna position when originally written, but is no longer constrained, as the tag may have been moved, For example, an MDV might consist of an FM Deviation, a Signal Strength (Received Signal Strength Indicator, RSSI) level, and a direction identifier between A and T. If the rule was "respond if Deviation is greater than or equal to 5 and signal strength is less than or equal to 8, and the antenna direction is equal to or less than G", then with an omni antenna, all tags would receive the signal, but only those that met this criteria would respond.

As a second alternative, the directional antenna could be used in place of an omni directional antenna as part of the interrogator/reader performing a tag ID read cycle. In this case, the direction is implicit in the antenna direction and sending antenna direction number provides change information. Only those tags that lie in the direction of the antenna pattern would see the RF energy and thus be in a position to respond. This technique has the advantage of being able to provide information about tag movement. If the original tag position was position M, and after reading all tags, it is found that this particular tag was found at position G (by using the directional antenna), the tag has moved from its original position. Either of these techniques satisfies the architecture of the invention. The preferred approach depends on the exact application, the number of tags to be read, the economics of hardware, etc.

Ideally, if enough MDV parameters are available, then each and every tag could be unique, and no collisions would ever occur. For example, assume that the MDV consisted of a Direction parameter with a resolution of 1 part in 32 (10 degree increments), a Polarization parameter with a resolution of 1 part in 2, a Signal Strength parameter with a resolution of 1 part in 10, and a FM Deviation parameter with a resolution of 1 part in 20. This would give a total tag resolution of 1 tag out of a field of 12,800 tags (32*2*10*20=12,800) meaning that one could resolve a single tag out of a field of 12,800 tags. Unfortunately, tags are usually not uniformly geographically spaced. Therefore, collisions remain likely even if the number of tags is less than 12,800. If the number of tags in the field is greater than 12,800, then collisions are guaranteed.

One method to fix this problem is to use a classic Aloha network. A classic Aloha network is created by allowing each tag to respond to one of several possible timeslots for each read command. The exact timeslot for a given tag is dependent on a random number created at the beginning of the process. The number of timeslots allowed by the system to handle collisions depends on the expected number of collisions. This in turn, depends on the ratio of the actual number of tags to the maximum tag resolution, and to other parameters such as spatial distribution in the tag field. For fastest response, the number of available timeslots would ideally be made equal to 2.72 times the average number of tags that reply to a given read command (rounded up). If a collision still results, the tags will back off for an additional period of time and try again.

Most of the parameters that make up the MDV are physical parameters that are measured by the tag and then compared against a random number generated by the tag. An exception, as described in an earlier part of the patent, dealt with position information where a directional antenna was used to program individual tags with location information. The idea is that only those tags that were in the antennas directional pattern would see the RF energy from the interrogator/reader. Since the antenna is transmitting information that it is at location X, then obviously those tags that were in the antenna pattern would be at location X, and they could use this information to program this location into their memory. The number takes the place of a random number for later comparison purposes.

Other physical parameters may use this same technique and either augment or replace the need for generating and using a random number for these parameters. If location based information sets are to be used as one of the MDV parameters, then these additional parameters are programmed into the tag at the same time. Some additional example parameters that may be used include polarization, time of day, and signal strength. Polarization and signal strength are maskable properties, while time of day is not a maskable parameter.

Suppose that while the system is programming position information using the directional antenna, it also transmits only a vertically polarized field (and it transmits as part of its initial tag programming not only a position parameter but a polarization parameter using the interrogator/reader. Only those tags that are in the antenna pattern and are vertically polarized will "see" the RF energy. The tag will then read these two pieces of information (location and polarization) and store them in tag memory. Once the tags have stored this information, they will no longer respond to a programming pulse from the interrogator/reader. After this is complete, the interrogator/reader changes its antenna polarization to horizontal and retransmits the location and the new polarization information. Now only those tags that are oriented in a horizontal polarization will see the RF energy from the interrogator/reader. They will store the information that the position is X and the polarization is horizontal in their tag memory. These two parameters, along with a possible third (tags that see both polarizations) will now be used in place of random numbers during future ID read cycles.

Another maskable signal parameter is signal strength. Because signal strength falls off rapidly with distance, this may be used as another parameter. Begin by transmitting the lowest possible power required to reach the closest tags. As part of the tag programming pulse generated by the interrogator/reader, a transmit power level of 1 (1 being the lowest possible power normalized to a maximum amount) is sent. The programming pulse now consists of three parameters; position, polarization, and signal strength. Only those tags that receive enough energy form this pulse will be able to use the information. The tags that do see the information will program these three parameters into tag memory to be used in future ID read cycles. Once this pulse is complete, the interrogator/reader will increment the power and power parameter by one unit, and a new group of tags will see the pulse and obtain their set of parameters. This whole cycle repeats until all possible combinations of position, signal strength, and polarization have been exhausted.

When a read ID cycle is instigated using this technique, random numbers are not needed as comparison points. Instead, the previously stored parameters are pulled from memory and used for comparison against the MDV. A final read request gathers all tags that have not yet responded.

This technique has a number of advantages. 1) No truly random numbers are needed by the tags. Randomness now occurs because of tag location, distance and orientation which, taken together may be quite random. 2) The packet overhead during the ID read cycle is lower since no control parameters other than the MDV need be transmitted. 3) Measurement of these parameters during the ID read cycle is no longer required since they had previously been determined during the interrogator programming pulse event. In fact, the tags will only see the RF energy if the all of the parameters are minimally met. If a directional antenna is used, then primarily those tags in the antenna pattern will see the ID read energy. If the interrogator/reader transmits a vertical polarization, then primarily those tags that are oriented vertically will see the energy and be able to respond. While antenna diversity also allows the tag to measure polarization, the proposed method is simple and has low processing overhead. The same is true for signal strength. Storing MDV information on the tags allows subsequent determination of a change in one of the parameters. For example, any change in tag position or environment, since the original position programming, is easily resolved.

An alternative technique for the ID read cycle is to remove all physical parameter information from the actual interrogator/reader transmitter. Making the antenna omni-directional, using circular polarization, and transmitting maximum power, so as to illuminate all the tags. The discrimination information is now carried entirely by the MDV and the comparison is made using only the information for the parameters stored in the tag memory at the time of the programming pulse. Suppose for example, that the rule was "respond if the signal strength is less than or equal to 8, the position is 2, and the polarization is horizontal". Then only those tags whose stored information matched these criteria would respond. Observe that in this case all tags in the interrogator/readers sphere of operation would see this energy. Observe further that no actual measurement is being made. In particular, look at signal strength. If the interrogator/reader transmits that the signal strength should be equal to or less than 8, then the tag goes to its memory and pulls out the original signal strength information and uses that for comparison. It no longer has to actually measure the RSSI (signal strength) because this information was programmed into its memory during the special programming cycle that occurred before the ID Read cycle was made. The special programming cycle effectively randomized the information for these parameters and the information was stored in the tags. The actual location, signal strength, and polarization no longer matter. Assuming that tags move around randomly, the parameters remain random, and the system still works. Even though this alternative embodiment requires a special programming cycle that will consume time, it may be faster than the embodiment discussed in the first part of this patent due to reduced header overhead and because certain measurements no longer need to be made by the tag.

Other examples of non-maskable signal properties that may be used as MDV parameters with the protocols already described include using an offset from discriminator center frequency. A simple frequency discriminator outputs a voltage proportional to the frequency offset from the center of its tuning. A low resolution (3 bit for example) analog to digital conversion (ADC) on the output from such a discriminator spanning the 915 MHz ISM band permits dividing the 26 MHz ISM band into 5 to 7 bins. An interrogator/reader employing a signal which jumps from one frequency in the ISM band to another, is called a Frequency Hopper. If the hop pattern is random, the output of the ADC will be a random sequence of values spanning the range from 0 to 7, for example. This random sequence is the non-maskable parameter sourced from the interrogator/reader which is then compared in the tag to the randomly selected MDV value.

The frequency shift from one channel to another created by a Frequency Hopping interrogator/reader may provide a non-maskable, measurable, parameter for use with the system described. The hopping code is arranged so that subsequent hops have a frequency separation (k Mod n) from the last value, where k is a fixed number and n is the number of channels. An AC coupled FM discriminator on the tag would output equal voltage steps at each hop. If the MDV parameter is the value of the voltage step, the Tag may choose to respond to an interrogator/reader only if the reader is using a particular value of k (hop increment). This technique may also be used to communicate other information to the tag, such as a seed to create a random number.

Another random basis set may be generated from a Direct Sequence Spread Spectrum Signal. While processing Direct Sequence Spread Spectrum signals in an ordinary way, using correlators, is impractical due to power consumption, an interrogator/reader utilizing Direct Sequence Codes to generate an on-off duty cycle easily creates a basis set of possible states. For example, 110110110 would be distinct from 111000111000, etc. The DS transmitter could be on-off keyed in pattern and clock rate—to achieve a large basis set, thereby providing a means for reading large numbers of tags from a single reader.

Figure 6A:
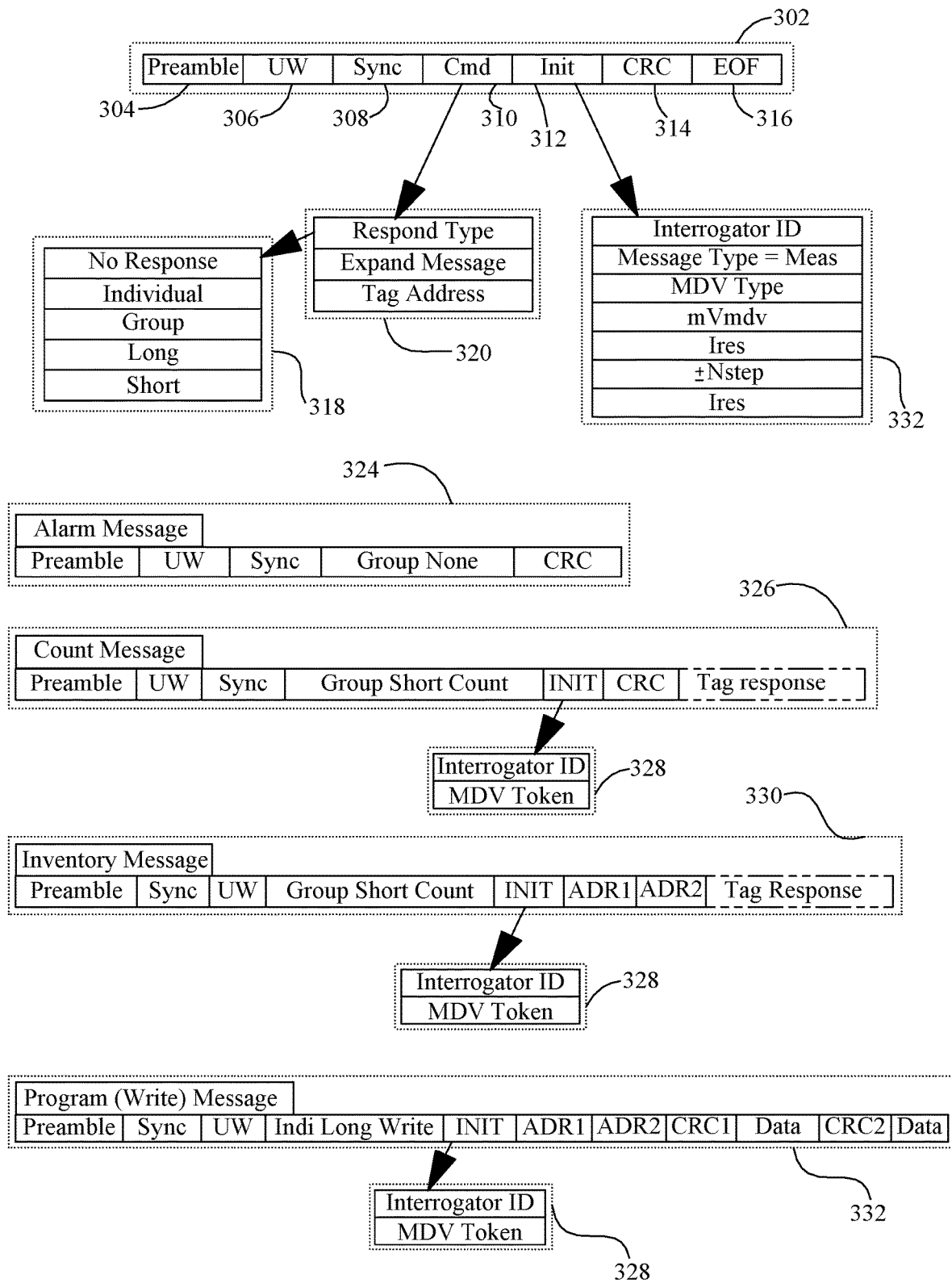
FIGS. 6A and 6B are block diagrams illustrating a message structure for the plurality of modes of operation of FIG. 2.

FIG. 6 illustrates a possible message structure 302 for tags utilizing Multidimensional Sieving techniques. The Interrogator sends a preamble 304 and a unique break symbol 306 followed by a sync symbol 308 to synchronize the tag receiver before any data is communicated. Following this set up, a command header [310] is transmitted. This header 310 tells the tag what kind of response 318 is expected as well as whether the message will contain additional information for the tag, beyond the header 320. To keep the Interrogator on-air time to a minimum, while increasing the capabilities of the system, the preferred approach is to address one of the MDV parameters at a time—with a fixed field message. This allows the system to adjust the number of dimensional vectors to the environment and the population estimate, if such an estimate exists. The initialization Header message 312 consists of options 322 an Interrogator ID field, a Message Type, and the MDV parameters: MDV type, and the variables $mV_{MDV}$, $I_{res}$ and $N_{STEP}$. The span between $mV_{min}$ and $mV_{max}$ is the product of $N_{STEP}$ and $I_{res}$. The Tag uses $I_{res}$ and $N_{STEP}$ to compute the other extreme of $mV_{MDV}$ whether $mV_{max}$ or $mV_{min}$. If $N_{step}$ is negative, the Tag has been given $mV_{max}$ and computes $mV_{min}$. If $N_{STEP}$ is positive, then the Tag has been given $mV_{min}$ and computes $mV_{max}$. Any of he Broadcast message types also send a CRC 314 which allows the Tag may confirm correct reception. In the event that a Tag does not receive the message correctly, it terminates its activity under that MDV parameter, and awaits either the next MDV or the collector message at the termination off the read cycle. An End of File 302 is sent following the CRD and allows the recipient to terminate processing in an orderly fashion.

The Initialization phase 312 continues until the Interrogator has broadcast all of the MDV parameter information it intends to use. Also built into the Initialization message structure, in the MDV variable, itself, is the ability to remove an MDV from the set of discrimination messages, or to remove all MDV records (for a restart). Finally, the MDV message carries an indicator informing the Tag that this MDV is environmentally maskable, or not. In the processing protocols introduced earlier, successful processing of an environmentally maskable parameter utilizes a different protocol than is used for parameters that are not maskable.

Other specific Functions performed by the Interrogator in the System described in FIGS. 1 and 2 include the Alarm Message 324, the Count Message 326, the Inventory Message 330, and the Program (Write) Message 332. The Inventory Message 330, and Program (Write) Message each include two fields, Addr1 and Addr2, indicating the starting and ending Tag memory address locations. Each message, including Count 326, Inventory 330, and Program 332 include a modified Initialization Header which informs the Tag of the parameters 328 including the Interrogator ID, and the Multidimensional Variable Tokens which collectively represent the Multidimensional Variable collection.

Figure 6B:
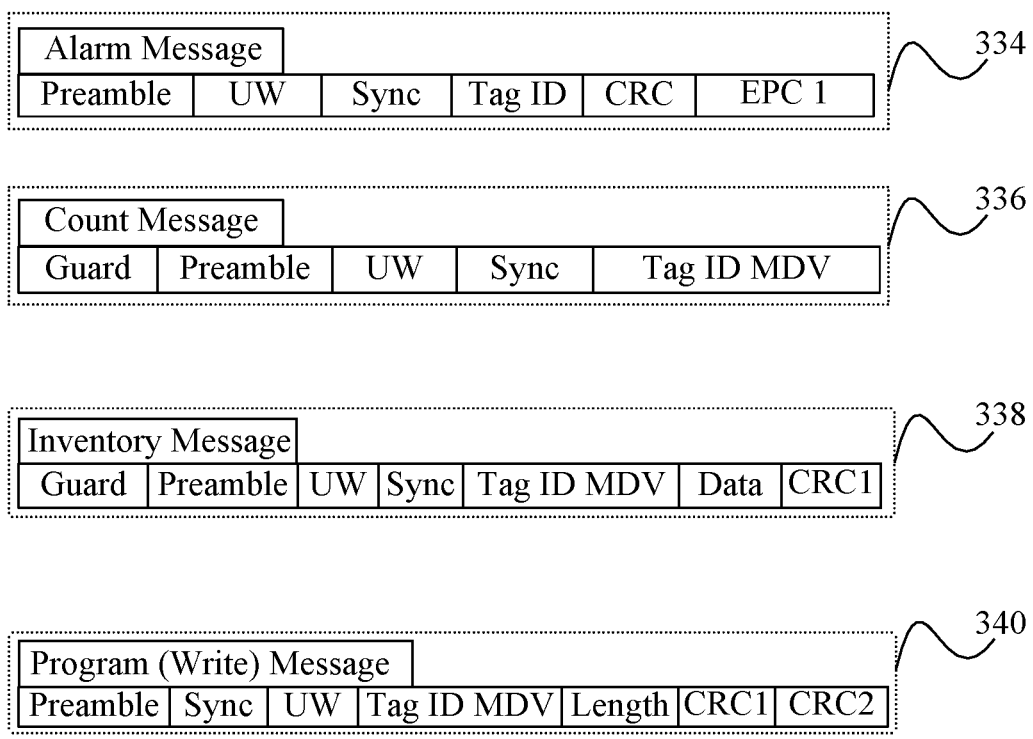

Shown in FIG. 6B are the corresponding Tag Message responses to the Interrogator commands described above. The Tag Alarm Message response 334, sends the Tag ID and includes an EPC identifier, for compatibility with other systems. The Tag Count Message 336, includes a guard time for timeslot alignment tolerances, and the Tag ID, expressed as the MDV (Multidimensional Variable). The Tag Inventory Message 338, includes a Guard Time, the Tag ID expressed as the MDV, a Data field containing the data to be communicated to the Interrogator, and a CRC. The Tag Program/Write Message responds with the Tag MDV and the Length of the memory programmed, as a confirmation to the Interrogator that the information between Tag Address Addr1 and Addr2 has been written. The Program Message is protected by dual CRC fields.

As noted earlier in FIG. 2, actions to Replace Tag_ID 29, Read Tag_ID 31, Read Tag_Data 33, and Write Tag_Data 35, are common tasks to all systems with memory that may be randomly read and written. In the preferred approach, these tasks are handled by using the Message Type in the message Header to inform the Tag which operational mode is requested. In the '805 patent, similar operations were allowed, but they were limited to actions on a single tag, or the entire population. In the present work, the ability to Replace Tag_ID 29, Read Tag_ID 31, Read Tag_Data 33, and Write Tag_Data 35 is permitted with individual Tags and the entire population, but adds the ability to split the Tags into domains for the purpose of batch processing. In the '805 patent, the only batch processing available was at the time of manufacture, or when a hardware reset returned the tag to it's manufactured default address state.

The process of splitting the Tag population into domains involves the use of an extension field [320] with the Message Type. This extension field tells the Tags that their response to the command will be modified to include, among other things, comparisons to values in memory (SKU numbers, memory ranges, etc.) and or response packet timing.

As an example, two Tags with same Unique ID in the field of the same reader will result in a collision, when the Tag is addressed. Normally, an addressed Tag will respond immediately to a Read or Write command. It will wait 0 timeslots before responding. In one of the extended modes, an addressed Tag will randomly choose to wait between 1 and P timeslots, where P is a value transmitted by the Interrogator in the extension field. This allows the Interrogator to 'test' for duplicate Tag addresses, and to split up Tags with the same Unique ID. When the Tag, receiving an extension address request responds, it also indicates in the message, which delay it used. A successful communication will be confirmed by the Interrogator by including this specific timeslot delay information in the confirmation message. The Tag will 'remember' this extension (delay value) and use this as an extended address, until such time as it is told to either choose a different Unique ID, or more likely, is told what Unique ID to use in the future.

As another example, an inventory containing, among other things, 1000 pieces of seasonal swimwear that is to be marked down. This merchandise is distinctly handled by a range of SKU codes stored in the Tags. Moreover, as an example, there are more Red swimsuits than other colors and these are to be further discounted. In the first step, an extended Read command is used to re-count all of the members of the population within the specific SKU range. This range is explicitly sent as part of the extended Read message. The next step is to use the same extension field with a Write command and the new pricing for the swimwear. All addressed Tags will accept the new information, but will not respond immediately. The Interrogator then performs another extended Read on the selected population, and each Tag confirms the price change with an abbreviated confirmation response, basically an Acknowledge (ACK) or Negative Acknowledge (NAK). If a NAK is received, the specific Tag is addressed and given the price change information. When all of the price changes have been confirmed, the Interrogator extension field is modified again to address only Red swimwear, and an additional price reduction factor is sent. The confirmation routine is repeated for this process. This procedure ensures that the basic price is recorded and the extra deep discount on Red swimwear is applied at the checkout register, notifying the customer that he has been given a 'special' discount.

The value of using extension fields is that the basic messaging between Interrogator and Tag is kept very short, minimizing the time required to perform inventory and tracking. Further, it allows for 'soft' engineering of the Interrogator/Tag system. By having a BIOS (basic input output system) structure, many user defined features may be added or modified in the field by the service provider to customize and to add value to the installation.

The invention may be embodied in other specific forms without departing from its spirit or essential characteristics. The described embodiments are to be considered in all respect only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. An RFID system comprising:
a plurality of RFID tags, each of said plurality of RFID tags having a unique identification code defined by initializing selected Multidimensional Vector (MDV) parameters for receiving a signal and for generating a response signal based thereon, each of said RFID tags using a reply flag in association with said predetermined multidimensional vector for determining whether to respond to a received message addressed to all of said plurality of RFID tags, wherein said Multidimensional Vector parameters consist of both environmentally maskable and unmaskable parameters, wherein said maskable parameter is selected from the group consisting of Direction, Phase, and Polarization.

2. The RFID system according to claim 1 wherein said unmaskable parameter is Frequency.

3. The RFID system according to claim 1 wherein said unmaskable parameter is Frequency Deviation.

4. The RFID system according to claim 1 wherein said unmaskable parameter is Spread Spectrum Code Parameters.

5. The RFID system according to claim 1 wherein said unmaskable parameter is Frequency Hop parameters.

6. The RFID system according to claim 1 wherein said unmaskable parameter is Timeslot choice.

7. The RFID system according to claim 1 wherein said maskable parameter is Signal Strength.

8. A method for an interrogator/reader to identify an RFID tag from a plurality of RFID tags comprising:
(A) initializing user selected multidimensional vector parameters upon receiving a read command for each RFID tag wherein each selected multidimensional vector parameter for each RFID tag is defined by a range of minimum and maximum vector values and a resolution value;
(B) setting a reply flag to a logical true value for each RFID tag;
(C) generating for each said plurality of RFID tags an integer random number having an integer value within said range of minimum and maximum vector values for each selected multidimensional vector parameter;
(D) receiving interrogator/reader generated environmentally modified measured multidimensional vector parameter values at each of said plurality of RFID tags and generating a random number;
(E) determining whether said success flag value for each said plurality of RFID tags is true wherein if said success flag is true for a given said RFID tag, said RFID tag has previously been read and said reply flag for said RFID tag is set a logical false value;
(F) comparing during each interrogator/reader cycle, said interrogator/reader generated, environmentally modified measured values to each selected multidimensional vector parameter for each RFID tag defined by a range of minimum and maximum vector values and resolution values wherein when a match occurs said RFID tag will respond to said interrogator/reader;
(G) transmitting by each of said RFID tags when said generated random number matches within said range of minimum and maximum vector values and resolution values, a unique code for identification associated with each RFID tag and then, upon successful communication, setting said success flag to a logical true value;
(H) waiting by each of said RFID tag where said generated random number does not match within said range of minimum and maximum vector values and resolution values for a next interrogator/reader cycle; and (I) examining said transmissions by each of said RFID tags by said interrogator/reader and ceasing the iterative transmission of said interrogator/reader cycle when no RFID tags respond by transmitting their unique code for identification, the said interrogator/reader transmits a command causing any remaining said RFID tags whose success flag is false to respond.

9. The method of claim 8 wherein the minimum and maximum vector values are calculated from a minimum value, a resolution value, and a number of steps.

10. The method of claim 8 wherein the minimum and maximum vector values are calculated from a maximum value, a resolution value, and a number of negative steps.

11. The method of claim 8 wherein the tags have been preprogrammed with environmentally maskable parameters.

12. The method of claim 8 wherein the reader/interrogator transmits its own unique identifier to the tag.

13. An RFID system, comprising:
(A) means for initializing user selected multidimensional vector parameters upon receiving a read command for each RFID tag wherein each selected multidimensional vector parameter for each RFID tag is defined by a range of minimum and maximum vector values and a resolution value;
(B) means for setting a reply flag to a logical true value for each RFID tag;
(C) means for generating for each said plurality of RFID tags an integer random number having an integer value within said range of minimum and maximum vector values for each selected multidimensional vector parameter;
(D) means for receiving interrogator/reader generated environmentally modified measured multidimensional vector parameter values at each of said plurality of RFID tags and generating a random number;
(E) means for determining whether said success flag value for each said plurality of RFID tags is true wherein if said success flag is true for a given said RFID tag, said RFID tag has previously been read and said reply flag for said RFID tag is set a logical false value;
(F) means for comparing during each interrogator/reader cycle, said interrogator/reader generated, environmentally modified measured values to each selected multidimensional vector parameter for each RFID tag defined by a range of minimum and maximum vector values and resolution values wherein when a match occurs said RFID tag will respond to said interrogator/reader;
(G) means for transmitting by each of said RFID tags when said generated random number matches within said range of minimum and maximum vector values and resolution values, a unique code for identification associated with each RFID tag and then, upon successful communication, setting said success flag to a logical true value;
(H) means for waiting by each of said RFID tag where said generated random number does not match within said range of minimum and maximum vector values and resolution values for a next interrogator/reader cycle; and
(I) means for examining said transmissions by each of said RFID tags by said interrogator/reader and ceasing the iterative transmission of said interrogator/reader cycle when no RFID tags respond by transmitting their unique code for identification, the said interrogator/reader transmits a command causing any remaining said RFID tags whose success flag is false to respond wherein the reader/interrogator transmits its own unique identifier to the tag.

14. The system of claim 13 further comprising means for calculating from a minimum value, a resolution value, and a number of steps for determining said minimum and maximum vector values.

15. The system of claim 13 further comprising means for calculating from a maximum value, a resolution value, and a number of negative steps for determining said minimum and maximum vector values.

16. The system of claim 13 further comprising means for preprogramming said tags with environmentally maskable parameters.

* * * * *